UNITED STATES PATENT OFFICE.

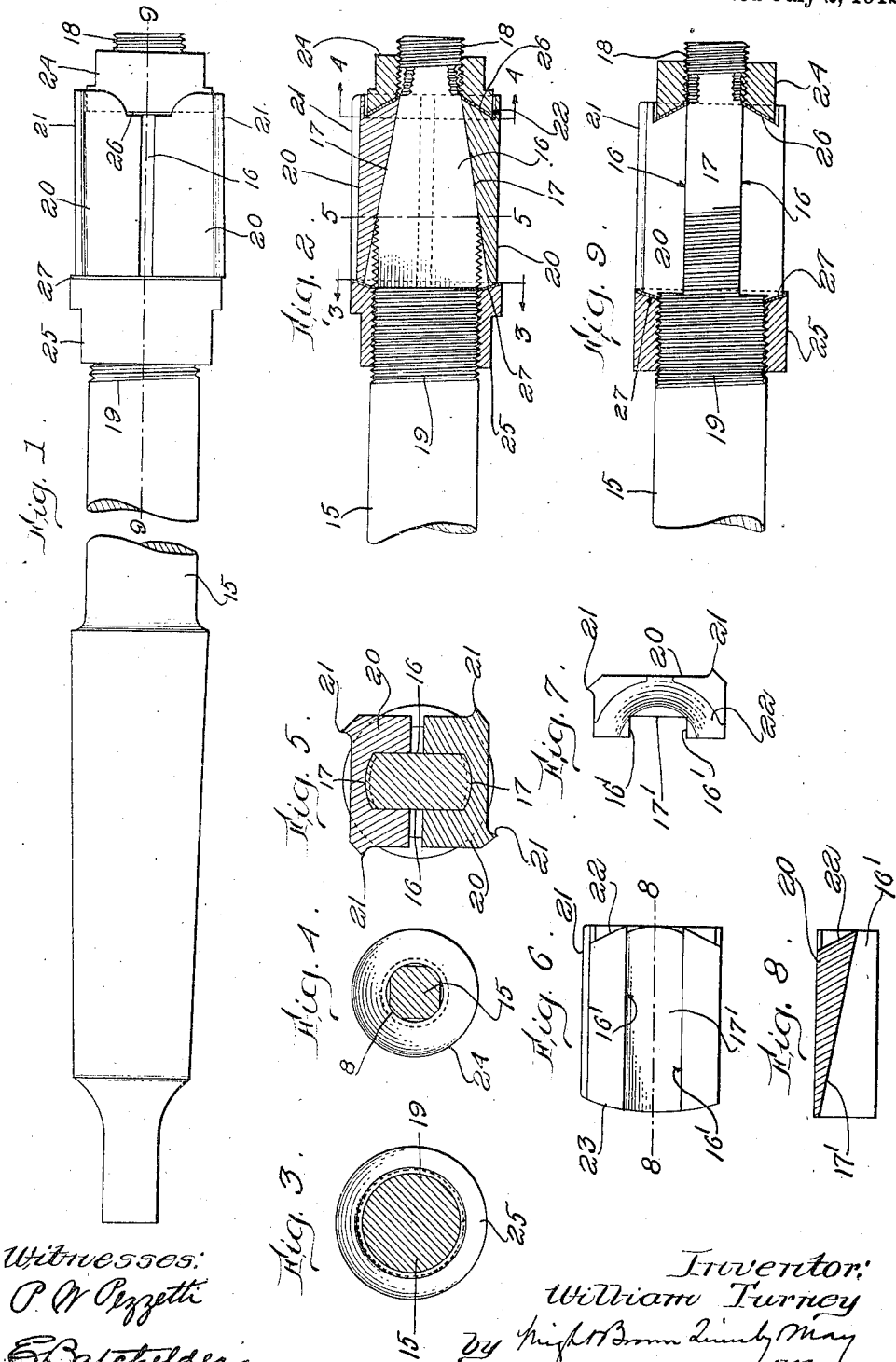

WILLIAM TURNEY, OF JACKSON, MICHIGAN.

EXPANSIBLE REAMER.

1,031,030.

Specification of Letters Patent.

Patented July 2, 1912.

Application filed September 30, 1910. Serial No. 584,638.

*To all whom it may concern:*

Be it known that I, WILLIAM TURNEY, of Jackson, in the county of Jackson and State of Michigan, have invented certain new and useful Improvements in Expansible Reamers, of which the following is a specification.

This invention relates to reamers of the same general character as that shown in United States Letters Patent No. 959,273, granted me May 24, 1910. The reaming members in that patent and in the present invention are arranged to slide upon converging seats, whereby the reamer is expanded or contracted when the reamer members are moved in one direction or the other upon their seats.

The object of the present invention is to provide simpler and more efficient means for locking the reaming members in the positions to which they are adjusted.

The locking means of the present invention consists of frusto-conical faces on the ends of the reaming members and nuts threaded upon the shank of the reamer and provided with internal frusto-conical faces adapted to coact with the ends of the reaming members to hold the reaming members against movement longitudinally and radially with relation to the shank. Locking nuts of this character and coacting in this manner are not in themselves new, the same having been employed in expansible reamers of which the shanks are frusto-conical and of which the adjustable members must be made so that they may expand and contract to fit the tapering shank at various points.

An important feature of the present invention is the shape of the shank and the arrangement of the coacting faces of the reaming members which engage the shank. The shank has opposed parallel faces and converging faces or seats. Each of the reaming members has an inclined face adapted to bear upon one of the seats of the shank, and has parallel faces adapted to embrace the parallel faces of the shank. The reaming members are therefore caused to move toward and from each other radially of the shank when they are moved longitudinally of the shank, but their engagement with the shank is uniform, regardless of their adjustment. In other words, the reaming member is not expanded nor contracted when it moves longitudinally or radially of the shank, but, on the other hand, it may move freely both longitudinally and radially when permitted by the locking nuts to move at all.

Of the accompanying drawings forming a part of this specification: Figure 1 represents a side elevation of a reamer constructed in accordance with this invention. Fig. 2 represents a longitudinal section of the operative portion of the reamer. Fig. 3 represents a cross section on line 3—3 of Fig. 2. Fig. 4 represents a cross section on line 4—4 of Fig. 2. Fig. 5 represents a cross section on line 5—5 of Fig. 2. Fig. 6 represents an elevation of the inner side of one of the reaming members. Fig. 7 represents an end elevation of one of the reaming members. Fig. 8 represents a section on line 8—8 of Fig. 6. Fig. 9 represents a section on line 9—9 of Fig. 1.

The same reference characters indicate the same parts wherever they occur.

The shank of the reamer is indicated at 15. The end of the shank which holds the reaming members is formed with opposed parallel faces 16 and with converging faces or seats 17. The end of the shank is screw-threaded, as indicated at 18, and the shank is also threaded as indicated at 19. The reaming members are indicated at 20, the said reaming members having cutting edges 21. Each of said reaming members is provided with internal parallel faces 16' and an inclined face 17', the parallel faces being adapted to embrace the faces 16 of the shank, while the inclined face 17' is adapted to bear upon an inclined face or seat 17 of the shank. The end faces 22 and 23 of the reaming members are partially frusto-conical. A nut 24 engaging the threaded portion 18 of the shank and a nut 25 engaging the threaded portion 19 are adapted to engage the ends of the reaming members and clamp said members between them. The coacting faces of the nuts are frusto-conical, as shown by Fig. 2, although these faces of the nuts are formed internally, whereas the frusto-conical faces of the reaming members are external.

It is intended that the length of the reaming members shall be equal so that they may be engaged equally and simultaneously by the nuts 24 and 25, but, inasmuch as slight variations in the length of the reaming members and slight irregularities in the formation of the end faces are likely to occur, washers 26 and 27 of ductile metal are interposed between the reaming members and the nuts. The washers are, of course, of frusto-conical form in order to conform to the coacting faces of the nuts and reaming members. The washers are sufficiently ductile to compensate for any irregularities that may exist in the reaming members, and they relieve the otherwise rigid coaction between the nuts and the reaming members so as to frictionally hold the nuts when they are tightened. In addition to causing the nuts to hold more firmly, the relatively soft washers enhance the efficiency of the reamer by overcoming the tendency of the reamer to chatter.

It is obvious that the reamer may be expanded by loosening the nut 25 and by turning the nut 24 to cause the reaming members to follow the nut 25. In order to detach the reaming members it is necessary only to loosen one of the nuts sufficiently to free the ends of the reaming members. The reaming members when released by the nuts are entirely free to be removed, because they do not at any position engage the shank with tension, this freedom of the reaming members being the result of forming them and the shank with opposed parallel faces.

I claim:

An adjustable reamer comprising a shank having a four-sided portion, two faces of which are flat and parallel to the axis of the shank, and the other two oppositely inclined with reference to the axis, reaming members each having confronting parallel faces and an inclined face, the inclined face being seated upon an inclined face of the shank, and nuts threaded on the shank at the ends of said four-sided portion, said nuts having internally tapered faces adapted to engage the ends of the reaming members, and the reaming members having complementally formed faces for engagement with the nuts.

In testimony whereof I have affixed my signature, in presence of two witnesses.

WILLIAM TURNEY.

Witnesses:
 W. P. ABELL,
 J. H. CHURCHILL.